(12) United States Patent
Vemulapalli et al.

(10) Patent No.: US 9,473,466 B2
(45) Date of Patent: Oct. 18, 2016

(54) SYSTEM AND METHOD FOR INTERNET PROTOCOL SECURITY PROCESSING

(71) Applicants: Jyothi Vemulapalli, Secunderabad (IN); Srinivasa Rao Addepalli, San Jose, CA (US)

(72) Inventors: Jyothi Vemulapalli, Secunderabad (IN); Srinivasa Rao Addepalli, San Jose, CA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 153 days.

(21) Appl. No.: 14/511,188

(22) Filed: Oct. 10, 2014

(65) Prior Publication Data

US 2016/0105401 A1 Apr. 14, 2016

(51) Int. Cl.
*H04L 29/06* (2006.01)
*H04L 29/12* (2006.01)

(52) U.S. Cl.
CPC ....... *H04L 63/0428* (2013.01); *H04L 63/0272* (2013.01); *H04L 63/164* (2013.01); *H04L 61/2007* (2013.01); *H04L 61/2503* (2013.01); *H04L 61/2592* (2013.01)

(58) Field of Classification Search
None
See application file for complete search history.

(56) References Cited

U.S. PATENT DOCUMENTS

| | | | |
|---|---|---|---|
| 6,510,464 B1 * | 1/2003 | Grantges, Jr. ..... | H04L 29/12594 709/224 |
| 8,191,134 B1 | 5/2012 | Thangavelu | |
| 8,301,875 B2 | 10/2012 | Sakai | |
| 9,258,742 B1 * | 2/2016 | Pianigiani ............. | H04W 28/12 |
| 9,317,702 B2 * | 4/2016 | Andersson ............ | G06F 21/602 |
| 2001/0047487 A1 | 11/2001 | Linnakangas | |
| 2002/0141371 A1 * | 10/2002 | Hsu ...................... | H04L 12/1877 370/338 |
| 2003/0063591 A1 * | 4/2003 | Leung ................. | H04L 12/1886 370/338 |
| 2003/0217292 A1 * | 11/2003 | Steiger .................. | H04L 63/126 726/3 |
| 2003/0228861 A1 * | 12/2003 | Leung ................. | H04L 12/1877 455/412.1 |
| 2008/0263353 A1 * | 10/2008 | Droms .............. | H04L 29/12283 713/153 |
| 2012/0226582 A1 * | 9/2012 | Hammad ................ | G06F 21/34 705/26.41 |
| 2013/0170502 A1 * | 7/2013 | Chen ................... | H04L 63/0272 370/401 |
| 2014/0059357 A1 * | 2/2014 | Andersson ............ | G06F 21/602 713/189 |
| 2015/0003453 A1 * | 1/2015 | Sengupta ................ | H04L 45/74 370/392 |
| 2015/0200838 A1 * | 7/2015 | Nadeau ................. | H04L 45/124 398/58 |

\* cited by examiner

*Primary Examiner* — Dede Zecher
*Assistant Examiner* — Richard McCoy
(74) *Attorney, Agent, or Firm* — Charles E. Bergere

(57) ABSTRACT

A decentralized method for IPSec processing in virtual environments includes assigning a unique identifier to each of a set of compute nodes. Each compute node can emulate one or more virtual machines that generate IP packets for forwarding over a network (e.g., the Internet). An IP packet, received from a trusted source at a compute node, is encrypted and a trailer is appended to the encrypted packet. The trailer includes the unique identifier of the compute node. The encrypted packet with appended trailer is forwarded to a secure gateway that can perform an anti-replay check using stored parameters corresponding to the unique identifier in the trailer. In inbound processing, the unique identifier is inserted into a trailer appended to an encrypted packet by the security gateway and a VPN server directs the incoming encrypted packet to the appropriate compute node for forwarding to the virtual machine.

7 Claims, 5 Drawing Sheets

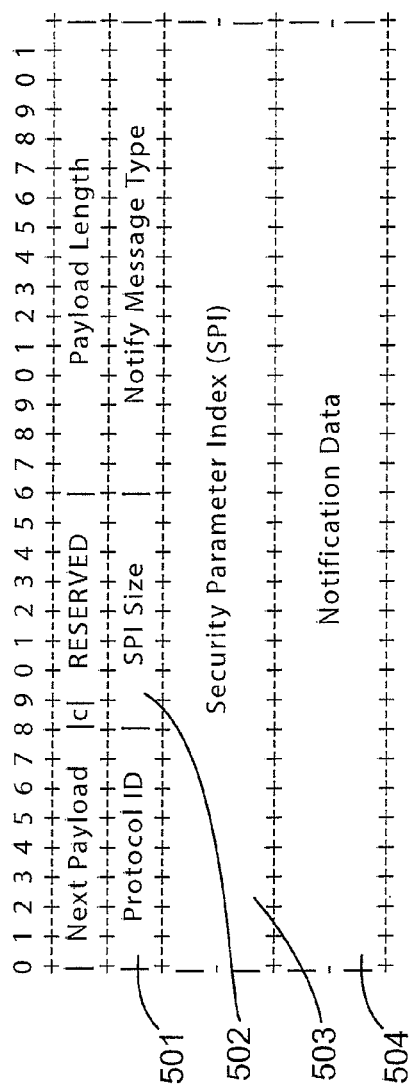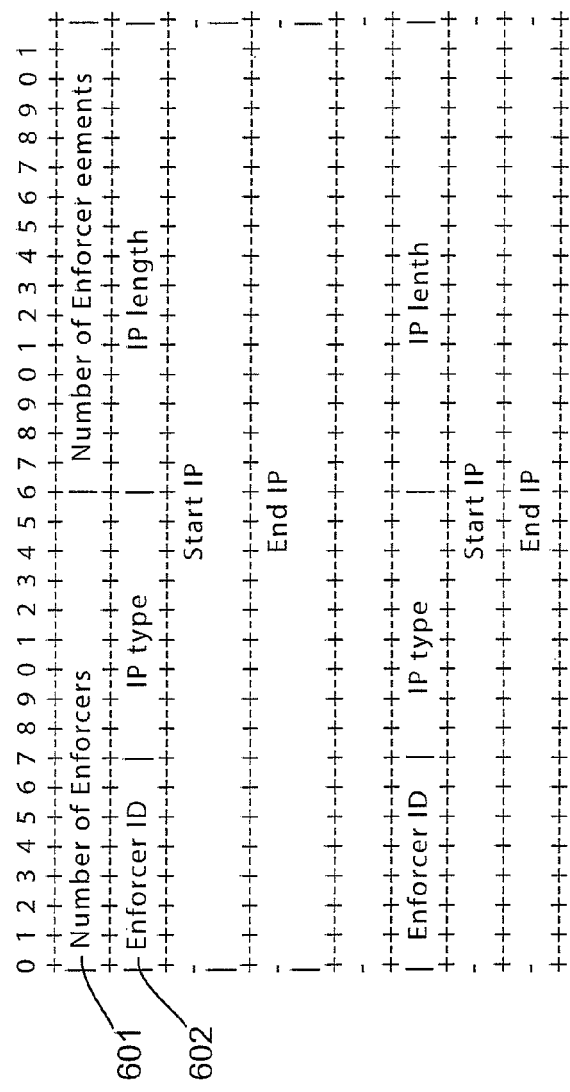

SYSTEM AND METHOD FOR INTERNET PROTOCOL SECURITY PROCESSING

BACKGROUND OF THE INVENTION

The present invention relates generally to Internet Protocol Security processing and, more particularly, to such processing in networking devices included in Virtual Networks.

IPSec (Internet Protocol Security) is a set of protocols defined by the Internet Engineering Taskforce. IPSec protects IP packets and upper layer protocols during transmission between peer nodes by introducing proof of origin and encryption. IPSec outbound processing, which is done when IP packets are received from a trusted network, uses encryption, encapsulating an IP packet inside an IPsec packet. IPSec inbound processing involves de-encapsulation, which happens at the end of the tunnel, where the original IP packet is decrypted and forwarded to its intended destination. Inbound processing may also involve an anti-replay check. An application of IPSec is in Virtual Private Networks (VPN), which extend a private network across a public network, such as the Internet. A VPN enables a computer or processing device to send and receive data across shared or public networks as if it were directly connected to the private network, while benefiting from the functionality, security and management policies of the private network.

One of the IPSec protocols used in a VPN is known as "Encapsulating Security Payload" (ESP) and provides confidentiality, data integrity, and data source authentication of IP packets. This requires the insertion of an ESP header after the IP header of an IP packet but in front of the data to be protected. An ESP trailer is inserted after the data to be protected. An ESP packet is identified in the protocol field of the IP header. In order to allow IPSec packets to be properly encapsulated and decapsulated it is necessary to associate security services and a key between the traffic being transmitted and the remote node which is the intended recipient of the traffic. The construct used for this purpose is a "Security Association" (SA). SAs are negotiated between peer nodes (or security gateways for example) using a mechanism known as "Internet Key Exchange" (IKE or IKEv2), and are allocated an identification known as a "Security Parameter Index" (SPI). The appropriate SA is identified to the receiving node by including the corresponding SPI in the ESP header. Details of the existing SAs and the respective SPIs are maintained in a Security Association Database (SAD) that is associated with each IPSec node. The precise way in which IPSec is implemented in a system depends to a large extent upon the security policy of the organization wishing to employ IPSec. For example, the organization may specify end-points (e.g., user terminals) to which IP packets may be sent, or from which they may be received, the particular security levels to be used for encrypting packets, etc. Policy is stored in a Security Policy Database (SPD) which is also associated with each IPSec node. Typically, the SPD is distributed amongst a plurality of entities of the IPSec node. A remote host wishing to participate in a VPN must negotiate at least one pair of SAs (one for sending data and one for receiving data) with a VPN server prior to exchanging user generated traffic with the private network. Negotiation is typically carried out using IKE or IKEv2 in accordance with security policy defined in a Policy Database (PD) held in the server. For each remote host participating in the VPN the server maintains a set of SAs in a Security Association Database (SAD).

Network virtualization technology helps in emulating virtual instances on a single hardware system and has many advantages which include low power consumption and reduced space. A typical virtual network may comprise multiple physical systems and each physical system may emulate multiple virtual machines. Each physical system may be referred to as a compute node. These compute nodes may have the capability of cryptography processing or IPSec functionality processing.

To setup an IP Security (or VPN) to a virtual network, a VPN server is installed, where the VPN server is typically connected between the internet and compute nodes. The compute nodes are located in the trusted network. IPsec applied packets coming from the untrusted network (or internet) are received by the VPN server. VPN server processes received IPSec packets and then may forward 'plain' (un-encrypted) IP packets to the compute nodes. Virtual machines which exist inside the compute nodes will receive those plain IP packets. The virtual machines may also generate IP packets destined for an untrusted network (or internet). The VPN server receives the IP packets coming from the trusted network and applies IPSec, and then forwards the IPSec applied packets to the untrusted network.

The above-mentioned approach to IPSec for virtual networks has the following problems however. VPN traffic is passed through one centralized system. IPSec involves cryptographic operations which require a lot of processing power. There can be a performance bottleneck. Traffic between the IPSec gateways and compute nodes is in clear (i.e., plain packets are transmitted and received), thereby risking exposure. There is under-utilization of resources.

Thus it would be advantageous to provide an IPSec processing method that mitigated the above disadvantages.

BRIEF DESCRIPTION OF THE DRAWINGS

The invention, together with objects and advantages thereof, may best be understood by reference to the following description of preferred embodiments together with the accompanying drawings in which:

FIG. 5 shows a notification payload format exchanged between devices operating in accordance with an embodiment of the present invention; and FIG. 6 shows an example of a notification data format included in the payload of FIG. 5.

DETAILED DESCRIPTION OF PREFERRED EMBODIMENTS

Figure 1:
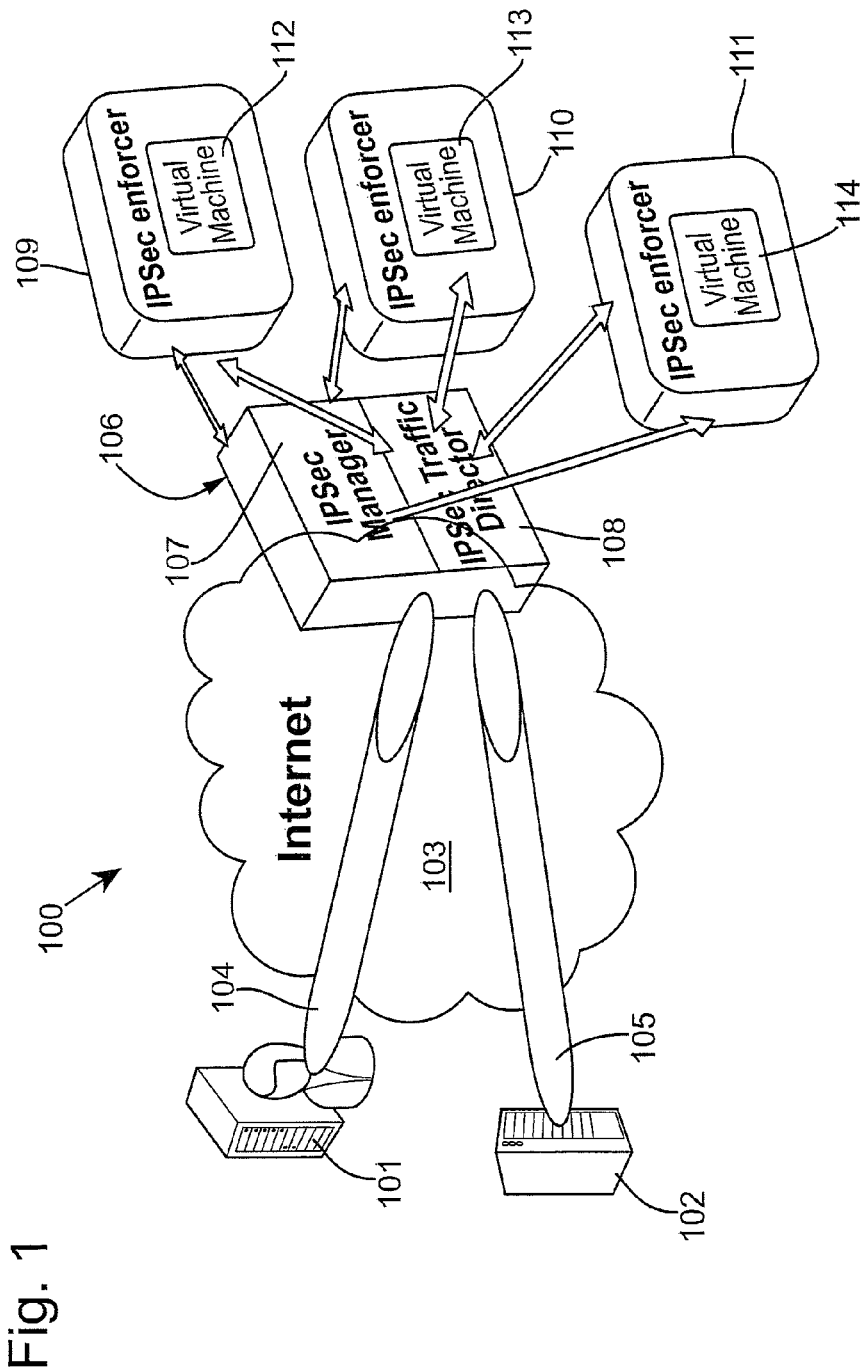
FIG. 1 is a simplified block diagram of a virtual private network in a decentralized virtualized network that can perform IPSec processing in accordance with an embodiment of the present invention.
Figure 2:
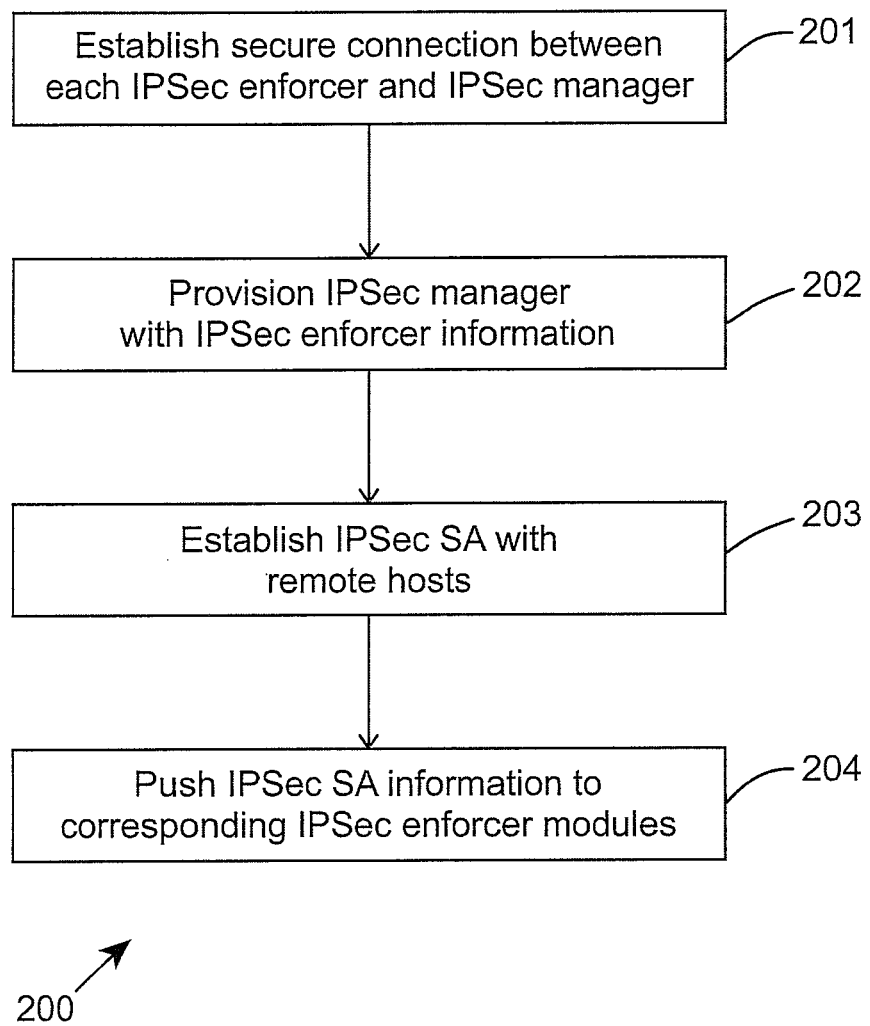
FIG. 2 is a flow chart illustrating an initialization process for performing IPSec processing in accordance with an embodiment of the present invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method of processing IP packets. The method includes the steps of: assigning a unique identifier to a first network device; at the first network device, receiving an IP packet, encrypting the packet, appending a trailer to the encrypted packet, where the appended trailer includes the unique identifier of the first network devices; and forwarding the encrypted IP packet with appended trailer to a remote network device. In this way, outbound IPSec processing can be performed.

In another embodiment, the present invention provides a first network device for processing IP packets, where the first network device has a unique identifier associated with it. The first network device includes: means for receiving an IP packet; means for encrypting the packet; means for appending a trailer to the encrypted packet, where the appended trailer includes the unique identifier; and means for forwarding the encrypted IP packet with appended trailer to a remote network device.

It will be understood that elements described using means-for language can be implemented by a processor coupled to a memory and that executes software or firmware (or both) to achieve the described function. While such processors and memories for performing similar functions are well known, it will be understood that the novelty lies in the ability to perform the described functions and the implementation therefor.

In one example embodiment, inbound processing can be performed by, at a second network device, receiving an encrypted IP packet including the appended trailer, extracting the unique identifier from the appended trailer, forwarding the encrypted IP packet with appended trailer to the first network device having the extracted unique identifier, and at the first network device, decrypting the encrypted IP packet with appended trailer and removing the appended trailer to produce a decrypted packet, extracting a destination address from the decrypted packet and forwarding the decrypted packet to the extracted destination address.

Advantageously, the present invention includes a system, network devices, and method for decentralizing IPSec packet processing in a virtualized environment. Herein, a virtualized environment includes one or more physical systems (referred to herebelow as IPSec enforcers) that are capable of emulating multiple virtual machines and have the capability of performing IPSec functionality processing. In some embodiments, each IPSec enforcer can emulate multiple virtual instances. Each virtual instance may be assigned one or more IP addresses. IPSec enforcers are located in the trusted network of a VPN server.

Referring now to FIG. 1, a simplified schematic diagram of a Virtual Private Network 100 including network devices operating in accordance with embodiments of the invention is shown. Remote hosts comprising a peer client node 101 and a peer VPN gateway 102 communicate over an Internet link 103 via respective secure tunnels 104, 105 with a VPN server 106. The VPN server comprises an IP Security Manager and an IPSec Traffic Director 108. In one embodiment, the VPN server 106 includes IKEv2 software. The IPSec traffic director 108 receives and transmits secure traffic in the form of IPSec packets to and from at least one IPSec enforcer module. In this embodiment, three IPSec enforcer modules 109, 110, 111 are shown but there may be more or fewer. Each IPSec enforcer module is 'behind' the VPN Server 106 and can emulate one or more virtual machines (or instances). Virtual machines emulated by each of the three illustrated IPSec enforcer modules 109, 110, 111 are represented by reference numerals 112, 113 and 114 respectively. Each IPSec enforcer module can also communicate with the IPSec Manager 107. Each IPSec enforcer module has a unique identifier associated with it which is known to the IPSec Manager.

Each IPSec enforcer module 109, 110, 111 establishes a secure connection with the IPSec manager module 107. The IPSec enforcer modules 109, 110, 111 and IPSec manager 107 can use Transport Layer Security (TLS) or any other appropriate security protocol for establishing a secure connection. Each IPSec enforcer module 109, 110, 111 informs the IPSec manager 107 of its unique identifier, its IP address and the IP addresses information of all the virtual instances (machines) 112, 113, 114 which are emulated by the IPSec enforcer. The IPSec Manager maintains (stores) information relevant to each IPSec enforcer module 109, 110, 111. This information includes the IPSec enforcer module ID (which may simply be a number), IP address of the IPSec enforcer module and IP addresses of any virtual machines emulated by an IPSec enforcer module. Each IPSec enforcer module 109, 110 111 can receive and send plain (i.e., not encrypted) IP packets to and from at least one virtual machine emulated by an IPSec enforcer module.

The IPSec Manager 107 establishes IPSec SAs with the peer VPN client 101 and the peer gateway 102. As part of this process, it sets up a modified 'IKEv2 AUTH' exchange (to be described in greater detail below). In one example, it adds to the IKEv2 AUTH exchange a notification payload that indicates that a decentralized method of operation is supported. The IPSec Manager also maintains the IPSec SA information in the IPSec Traffic director 108. The IPSec Manager 107 is further configured to compare the source IP addresses of IPSec SA selectors with IP addresses of virtual machines 112, 113, 114 emulated by each IPSec enforcer module 109, 110, 111. If a match is found, it pushes the IPSec SA information to the corresponding IPSec enforcer module (or modules).

The IPSec traffic director 108 relays IPSec packets between the Internet and an appropriate IPSec enforcer module. In one embodiment, it is additionally configured to process traffic from legacy peer nodes and gateways.

Each IPSec enforcer module 109, 110, 111 is a physical system, behind the server 106, which assists in providing IPSec security to a virtual environment. For example, a virtual instance can be emulated on any one of the IPSec enforcer modules. Each IPSec enforcer module is configured to process (e.g., de-crypt) IPSec packets received from the IPSec traffic director 108 and to send the resulting plain packet to the relevant virtual machine which it emulates. In the case of an IP packet generated by a virtual machine 112, 113, 114 the corresponding IPSec enforcer module receives the packet, processes the packet (including encryption) and sends it to the traffic director 108 for onward transmission over the internet 103.

An IPSec initialization process 200 in accordance with an example of the invention will now be described with reference to the simplified flow chart of FIG. 2 and FIGS. 1, 5 and 6.

At 201 each IPSec enforcer 109, 110, 111 establishes a secure connection with the IPSec manager 107.

At 202, the IPSec manager 107 is provisioned with IPSec enforcer module information. This information, (supplied by each IPSec enforcer module) includes the ID of each IPSec enforcer module, each IPSec enforcer module's IP address and the IP addresses of the virtual machines emulated by each IP enforcer module.

At 203, the IPSec manager 107 establishes IPSec SA with each remote host/security gateway (e.g., 101, 102 of FIG. 1). Anti-replay parameters in respect of the IPSec enforcer modules are internal to the SA. A modified IKEv2 exchange which indicates that decentralization of IPSec processing is supported. In one example, a modified IKEv2 AUTH request is sent by the IPSec manager 107 to each host/security gateway 101, 102. A standard IKEv2 AUTH request message can be modified to include an added notification payload comprising an appended "decentralized IPSec supported" field. In response, the remote host/security gateway 101, 102 sends back a modified IKEv2 AUTH response message including the appended "decentralized IPSec supported" field. An example of the modified IKEv2 notification payload format is shown in FIG. 5 where the type of the notification payload is decentralization of IPSec processing. The illustrated format includes information on protocol 501, SPI size 502, Security Parameter Index 503 and the notification data 504. An example of the notification data format is shown in FIG. 6. This includes a number of IPSec enforcers field 601, an IPSec enforcer ID field 602 and IP addresses of the virtual machines 112, 113, 114 (instance) emulated by each IPSec enforcer module. In FIG. 6, 'Start IP', 'end IP' and 'IP types' are used to specify or negotiate the IP addresses of virtual machines. Hence, communicating gateways which both support decentralization of IPSec processing negotiate IPSec enforcer information for each IPSec enforcer 109, 110 111 along with its range of virtual machines' IP addresses (for each IPSec enforcer) in the notification payload.

At 204, the IPSec manager compares the source IP addresses of IPSec SA selectors with IP addresses of virtual machines emulated by each IPSec enforcer module to find a match. Each IPSec SA contains the selectors information. This selectors information contains the Source IP addresses and destination IP addresses. These IP addresses are used to compare against the received plain IP packet source and destination IP addresses. If the received plain IP packet source and destination IP addresses are matching with one of source and destination IP addresses of SA selectors, then only that SA is used to apply IPSec on that IP packet. So if a match is found, the IPSec manager pushes the IPSec SA information to the corresponding IPSec enforcers. The IPSec enforcer ID is included in the IPSec SA.

The same IPSec SA is used to encrypt IP packets by multiple IPSec enforcers. Remote hosts maintain a set of anti-replay parameters for each IPSec enforcer. Remote hosts are able to handle IPSec packets coming from multiple IPSec enforcers by using one IPSec SA. In this case, remote hosts receive multiple IPSec packets with the same sequence number. Remote hosts have the capability of differentiating the IPSec packets coming from different IPSec enforcers. The SA is created to hold a multiple set of anti-replay check parameters, one set per each IPSec enforcer module and includes the last received sequence number and an anti-replay window which can be implemented using an array of integers or characters. Based on the IPSec enforcer ID, a remote host extracts the anti-replay parameters corresponding to that IPSec enforcer ID and performs the anti-replay check.

Figure 3:
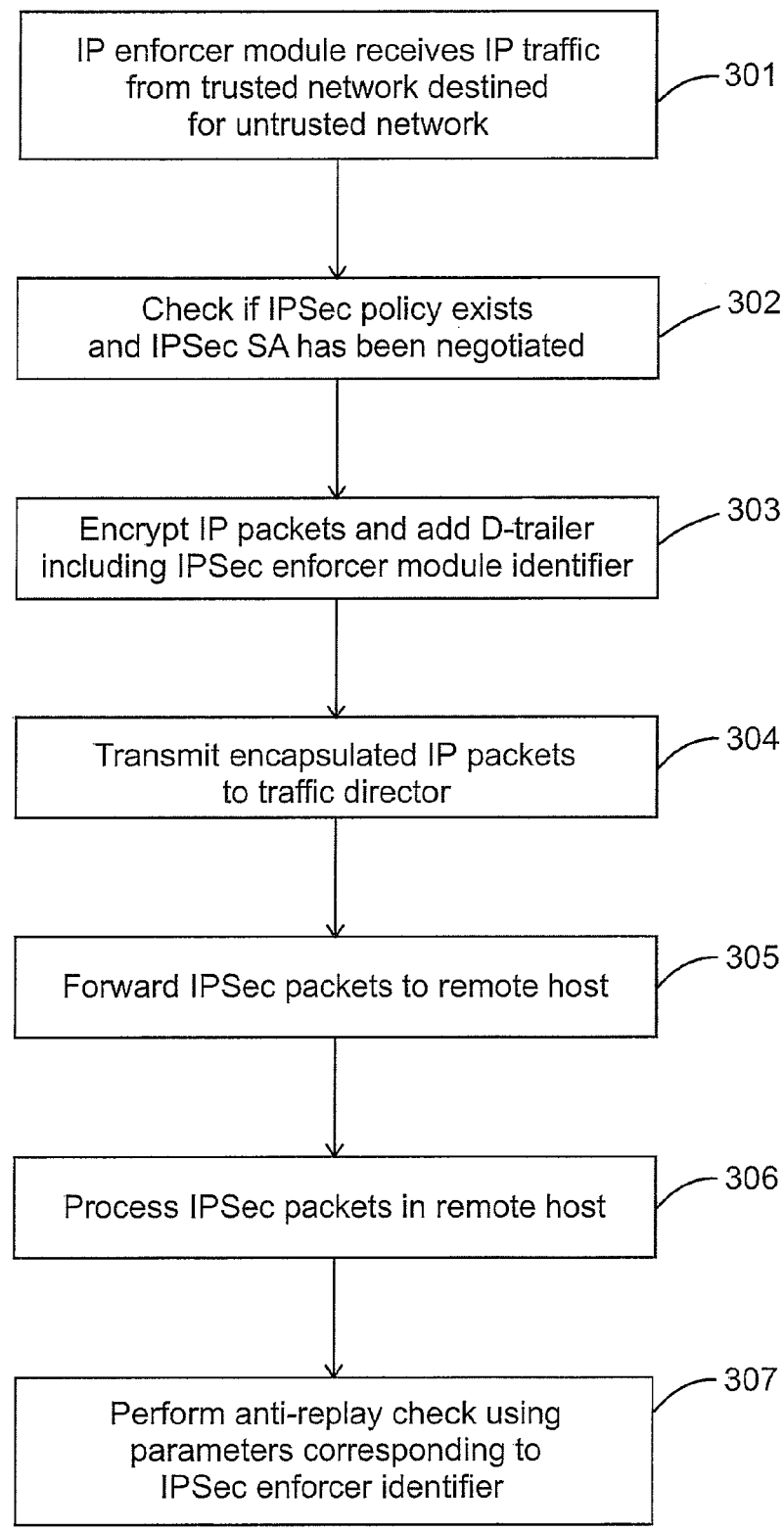
FIG. 3 is a flow chart illustrating a method for outbound IPSec processing in accordance with an embodiment of the present invention.

A method 300 for IPSec outbound processing in accordance with an embodiment of the invention will now be described with reference to the simplified flow chart of FIG. 3. When an IP packet is received from a trusted network and is to be routed to an untrusted network IPSec outbound processing is applied to those IP packets. For example, virtual machines which are emulated on IPSec enforcers 109, 110, 111 (see FIG. 1) may wish to communicate with remote hosts or hosts which are behind peer security gateways and which are in the internet. Virtual machines generate the IP traffic destined for those remote hosts. The IPSec enforcer module 109 corresponding to a particular virtual machine 112 which is generating IP traffic, receives the IP traffic at 301.

At 302, the IPSec enforcer module checks whether an IPSec policy exists and if an IPSec SA has been negotiated. This can be done using conventional methods. Additionally, it is established that the remote hosts are capable of handling IPSec packets coming from multiple IPSec enforcer modules. In the IKEv2 AUTH exchange described above with reference to FIG. 2, if the remote host sends the notification payload of type 'decentralization of IPSec processing' to the IPSec manager, then it can be assumed that the remote host is capable of handling IPSec packets from multiple IPSec enforcer modules. This capability information is included as part of the IPSec SA.

At 303, the IPSec enforcer module encrypts received IP packets using a modified IPSec ESP packet format. The modification comprises an additional trailer also referred to herein as a 'decentralize trailer' or 'D-trailer.' In one example, the D-trailer comprises a 32 bit IPSec enforcer ID followed by a 32 bit higher order sequence number. For outbound processing of packets, the relevant IPSec enforcer module's identifier is set as the 32 bit IPSec enforcer ID. If the known IPSec feature of ESN (Extended Sequence Number) is not selected, then the higher order sequence number is set to zero. In the ESN process, instead of using one 32 bit sequence number, two 32 bit sequence numbers (32 bit higher order sequence number, 32 bit lower order sequence number) are used to perform an anti-replay check. One lower order 32 bit sequence number is sent as part of the IPSec packet and the next 32 bit higher order sequence number is internally computed based on the last received sequence number and the current received sequence number. The modified ESP IPSec packet comprises, in sequence, IP header, ESP header, IP header, encrypted data, ESP trailer, D-trailer and an encrypted and a calculated Integrity Checksum Value (ICV). In one example, the information contained in the D-trailer is authenticated as part of the packet. As IPSec uses the ESP protocol, this protocol internally has the functionality of both encryption and authentication. In this example, the D-trailer comprises an additional eight bytes.

At 304, the encapsulated packet, now comprising secure traffic, is sent to the IPSec traffic director 108 (see FIG. 1).

At 305, the IPSec traffic director forwards the secure IP traffic to the remote host by applying the source NAT.

At 306, the remote host receiving the secure IP traffic comprising IPSec packets processes the packets and extracts the IPSec enforcer ID from the D-trailer.

At 307, the remote host performs an anti-replay check by extracting the anti-replay parameters corresponding to the IPSec enforcer ID.

Figure 4:
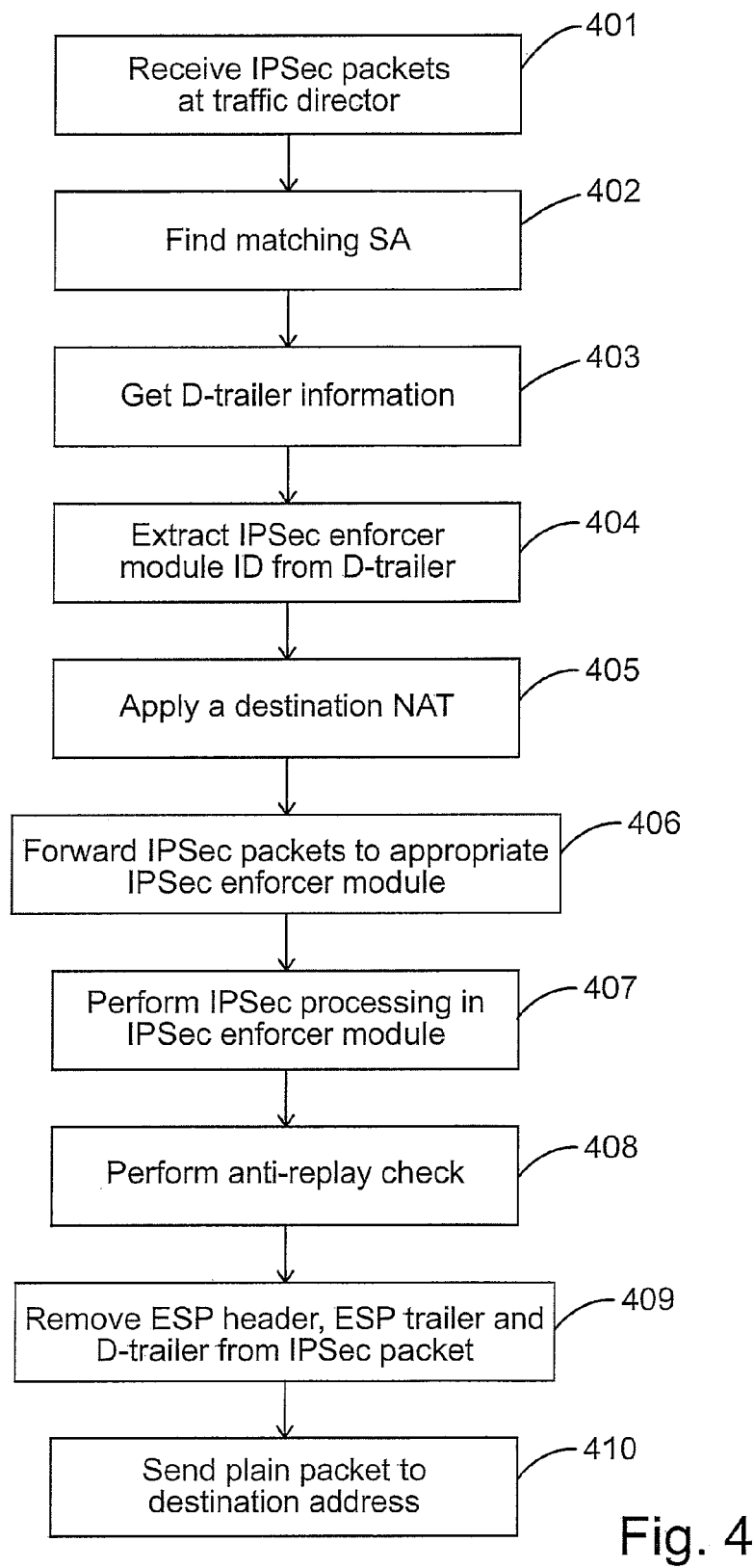
FIG. 4 is a flow chart illustrating a method for inbound IPSec processing in accordance with an embodiment of the invention.

A method 400 for IPSec inbound processing in accordance with an embodiment of the invention will now be described with reference to the simplified flow chart of FIG. 4 and FIG. 1. In this example of inbound processing, a remote host receives an IP packet destined for a particular IP address, which it identifies as belonging to a virtual machine emulated by one of the IPSec enforcers. The remote host performs IPSec processing on the IP packet. This processing includes appending a D-trailer (as described above with reference to FIG. 3) to the encapsulated packet. The remote host matches the destination IP address of the packet to the appropriate IPSec enforcer module by using the information received from the IPSec manager as part of the modified IKEv2 exchange process described above. The remote host is thus able to insert the identifier of the appropriate IPSec enforcer into the enforcer ID field of the D-trailer. At 401, encapsulated IPSec packets, which include the D-trailer, are transmitted from the remote host in the internet and received at the IPSec traffic director.

At 402, the traffic director processes the incoming IPSec packets by finding a matching IPSec SA, by searching an associated SA database, and validating the incoming ESP packets. If no SA is found or if a packet is found to be invalid, then that packet is dropped. It also checks that a D-trailer is present in the received IPSec packet. If no D-trailer is present, the packet is dropped.

At 403, the traffic director gets the D-trailer information.

At 404, the traffic director extracts from the D-trailer, the (four byte) IPSec enforcer module ID. The traffic director then is able to match an IPSec enforcer IP address to the extracted ID from information maintained by the traffic manager.

At 405, the traffic director applies a destination NAT (Network Address Translation) to the received IPSec packet. The destination IP address of the IP header is changed to the appropriate IPSec enforcer's IP address.

At 406, each IPSec packet is forwarded by the traffic director to the appropriate IPSec enforcer module.

At 407, an IPSec packet is received at an IPSec enforcer module where inbound IPSec processing is performed.

At 408, the IPSec enforcer module extracts the higher order 32 bit sequence number from the D-trailer and performs an anti-replay check.

At 409, in the IPSec enforcer module, the ESP header, ESP trailer and D-trailer are removed from the IPSec packet to leave a 'plain' packet.

At 410, the plain packet is sent by the IPSec enforcer module to the virtual machine whose IP address is contained in the IP header.

A system in accordance with an embodiment of the invention has the advantages of optimizing resources by distributing IPSec processing across multiple physical systems by utilizing the security engine and specialized packet processing capabilities of computing nodes. Further, there is no exposure of clear/plain/unencrypted traffic within the trusted network which is behind the VPN server (e.g., a LAN or virtual network). A further advantage of the invention is that it is useful in load balancing of IPSec systems.

Methods of the present invention can also support legacy IPSec. If inbound IPSec packets received by the traffic director do not contain a D-trailer, then in one embodiment, the traffic director decrypts the first 24/48/64 bytes of the received packet. The inner IP destination address is extracted from the decrypted data and the packet is forwarded to the IPSec enforcer module appropriate to that extracted address.

The invention may be implemented in a computer program for running on a computer system, at least including code portions for performing steps of a method according to the invention when run on a programmable apparatus, such as a computer system or enabling a programmable apparatus to perform functions of a device or system according to the invention. As an example, a non-transitory computer-readable medium may be provided having computer-readable instructions stored thereon for performing methods according to the invention as described herein.

The non-transitory computer-readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method of processing IP packets, the method comprising:
   assigning a unique identifier to a first network device; and
   at the first network device:
      receiving an IP packet;
      encrypting the IP packet;
      appending a first trailer to the encrypted IP packet, wherein the first trailer includes the unique identifier; and
      forwarding the encrypted IP packet with the first trailer to a remote network device;
   at the remote network device:
      receiving a second IP packet from an untrusted source;
      identifying a destination address included in the second IP packet;
      encrypting the second IP packet;
      appending a second trailer to the encrypted second IP packet, wherein the second trailer includes the unique identifier of the first network device that emulates a virtual machine having the identified destination address; and
      forwarding the encrypted second IP packet with the second trailer to a second network device; and
   at the second network device:
      receiving the encrypted second IP packet with the second trailer from the remote network device; and
      forwarding the encrypted second IP packet to the first network device that emulates the virtual machine having the identified destination address.

2. The method of claim 1, further comprising:
   at the second network device, initiating an IKE (Internet Key Exchange) procedure with the remote network device, wherein the second network device notifies the remote network device of the unique identifier of the first network device, an IP address of the first network device, the destination address of virtual machines emulated by the first network device and anti-replay parameters associated with the first network device.

3. The method of claim 1, further comprising:
at the remote network device:
maintaining anti-replay parameters corresponding to the first network device;
extracting the unique identifier from the appended trailer of the received encrypted IP packet with the first trailer;
extracting anti-replay parameters corresponding to the extracted unique identifier; and
performing an anti-replay check.

4. The method of claim 1, further comprising the first network device performing an anti-replay check on a received encrypted IP packet.

5. A system for processing IP packets, the system comprising:
a first network device for emulating at least one virtual machine having a destination address, wherein the first network device has a unique identifier associated therewith and an IP address;
a remote network device; and
a second network device for storing information relating to the first network device and for forwarding the information to the remote network device,
wherein the first network device is arranged to:
receive a first IP packet from one of the at least one virtual machines,
encrypt the first IP packet,
append a trailer to the encrypted first IP packet,
wherein the appended trailer includes the unique identifier, and
forward the encrypted first IP packet with the appended trailer to the remote network device,
wherein the remote network device is arranged to:
receive a second IP packet from an untrusted source;
identify a destination address included in the second IP packet;
encrypt the second IP packet;
append a second trailer to the encrypted second IP packet, wherein the second trailer includes the unique identifier of the first network device that emulates the virtual machine having said identified destination address; and
forward the encrypted second IP packet with the appended second trailer to the second network device; and
wherein the second network device is arranged to:
receive the encrypted second IP packet with the appended second trailer from the remote network device; and
forward the encrypted IP second packet to the first network device that emulates the virtual machine having said identified destination address.

6. The system of claim 5, wherein the first network device is further arranged to:
receive the encrypted first IP packet including the destination address from the remote network device;
decrypt the encrypted first IP packet; and
forward the decrypted first IP packet to the destination address.

7. The system of claim 5, wherein the information relating to the first network device comprises:
the unique identifier of the first network device;
the IP address of the first network device;
the destination addresses of virtual machines emulated by the first network device; and
anti-replay parameters associated with the first network device.

* * * * *